United States Patent [19]

Phillips

[11] Patent Number: 4,781,150
[45] Date of Patent: Nov. 1, 1988

[54] ANIMAL RESTRAINING DEVICE

[76] Inventor: Roy L. Phillips, Rte. 1, Box 60, Milford, Tex. 76670

[21] Appl. No.: 31,667

[22] Filed: Mar. 30, 1987

[51] Int. Cl.⁴ .............................................. A01D 3/00
[52] U.S. Cl. ...................................... 119/98; 17/1 A; 17/44
[58] Field of Search .................. 119/96, 98, 100, 101, 119/102, 103, 130, 151, 65; 128/133, 134; 17/1 A, 11, 44, 44.1, 44.2

[56] References Cited

U.S. PATENT DOCUMENTS

| 462,117 | 10/1891 | Emerson | 17/11 |
|---|---|---|---|
| 1,398,484 | 11/1921 | Holding | 119/98 |
| 1,866,683 | 7/1932 | Tinnes | 17/44 X |
| 2,518,231 | 8/1950 | Fudge | 17/11 |
| 2,929,357 | 3/1960 | Hoyme et al. | 119/98 |
| 3,138,141 | 6/1964 | Poage | 119/103 |
| 3,361,132 | 1/1968 | Rentsch, Jr. | 128/134 |
| 3,464,392 | 9/1969 | Hoyme et al. | 119/103 |
| 4,396,014 | 8/1983 | Pace et al. | 128/133 |

Primary Examiner—Robert P. Swiatek
Assistant Examiner—R. Thomas Price
Attorney, Agent, or Firm—Clarence F. Stanback, Jr.

[57] ABSTRACT

An animal slaughtering device comprising a tapered cone-shaped cylinder having a split located centrally thereof and extending lengthwise over the cylinder for the purpose of being expandable to accommodate animals of more than one size, whereby the device can be hung over a fence or slaughtering post for support while the device is being used.

5 Claims, 1 Drawing Sheet

ANIMAL RESTRAINING DEVICE

BACKGROUND OF THE INVENTION

Among one of the oldest practices performed by man is the breeding and caring of animals to provide meat to feed himself and family. A variety of restraining devices to aid in the handling of the animals have been utilized in the past, although these devices have been complicated in their construction. Typically, these devices have been limited in shape to accommodate a particular sized animal and have not been adapted to allow handling the animals for more than one purpose. These devices have an opening on either end through which the nose and bottom of the animal extend and are not adjustable in size.

The devices utilized for restraining the animal are in need of substantial improvement in that the devices first utilized by man, and even those utilized at the present, require complex construction and are not easy to use. Further, such devices are often expensive to make and require substantial maintenance in order that the purpose for which the device is made is fully realized. Moreover, the devices are generally designed to accommodate only one size animal for one purpose, and thus, it it necessary to have more than one device for restraining and handling a variety of animals; for example, different devices would be needed to hold a pig in order to neuter, vaccinate, ring the nose, detusk, or work on the hemorrhoid of the pig.

When the device is in use, it must withstand great tension since the animal must be substantially restrained and made immovable in preparation for and to facilitate the various tasks that need to be performed. Therefore, a durable, yet somewhat flexible, device which can be repeatedly and easily used are important characteristics which a versatile restraining device should comprise.

Accordingly, devices for restraining animals, particularly small animals, are in need of substantial improvement for the ease of use, increased flexibility, economy of construction, and adjustability for accommodating more than one size of animal for various procedures that need to be performed on the animal.

SUMMARY OF THE INVENTION

There is, therefore, provided in the practice of this invention an improved animal restraining device comprising a tapered cone-shaped cylinder having a split located centrally of and extending lengthwise over the cylinder for the purpose of being expandable to accommodate small animals of more than one size. The device is designed for hanging over a fence or stationary tool for supporting the device when in use. There are a plurality of strap-buckle arrangements located adjacent the split for securing the body of the animal and a strap-buckle arrangement at the base of the cylinder for securing the rear legs of the animal in order that various procedures can be performed on the animal.

These and other features and advantages of the present invention will be appreciated as the same becomes better understood by reference to the following detailed descriptions of the presently preferred embodiment when considered in connection with the accompanying drawings wherein.

DESCRIPTION

Figures 1, 2, 3:
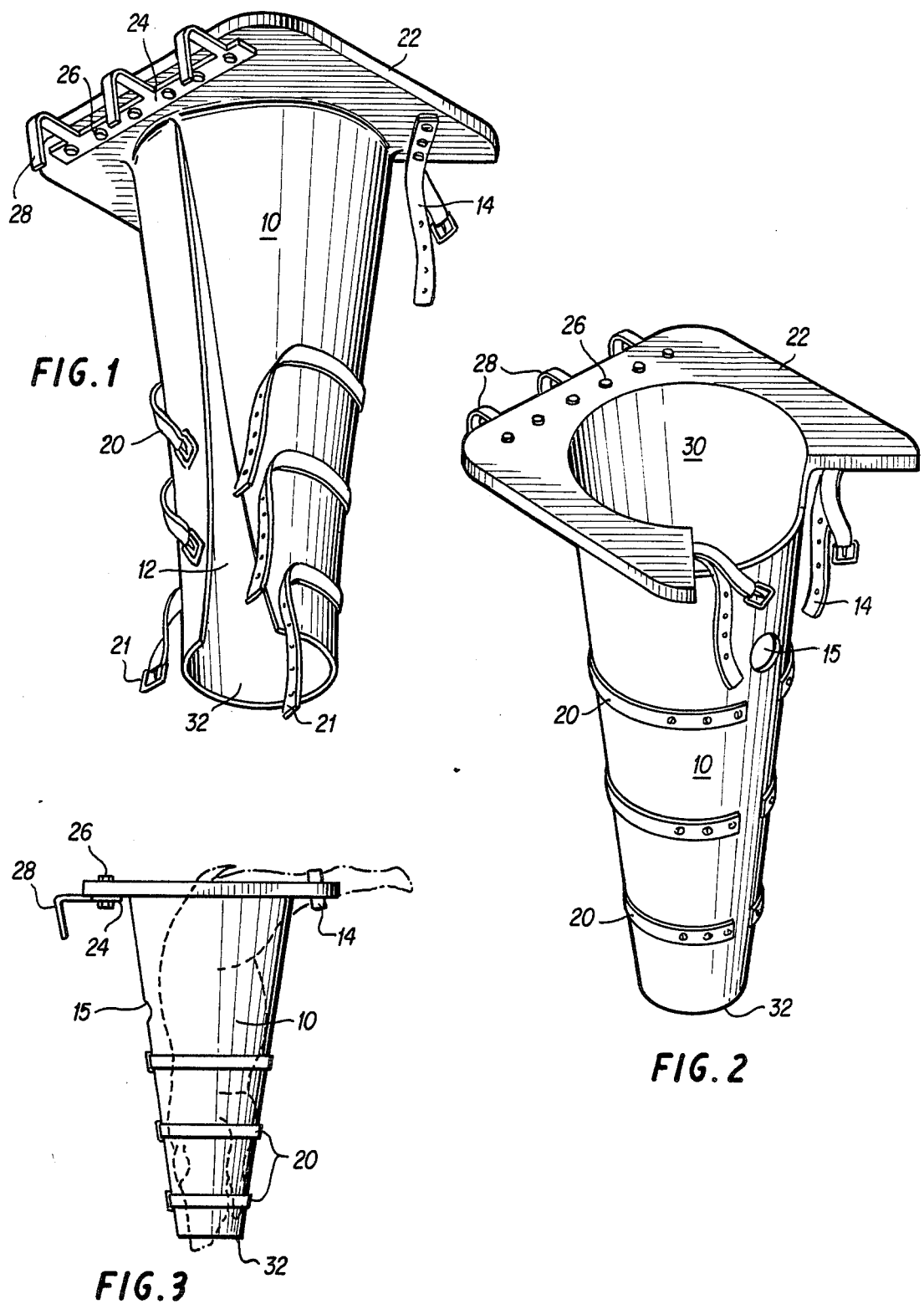
FIG. 1 is a perspective view of an improved, inexpensive animal restraining device showing the device in a partially open position.
FIG. 2 is a perspective view illustrating the bottom portion and cone-shape of the device and the strap-buckle used to secure the rear legs of the animal.
FIG. 3 is a side view of an improved animal restraining device constructed and utilized according to the principles of this invention.

FIG. 1 illustrates a perspective view of an improved, inexpensive animal restraining device comprising a cone-shaped cylinder 10 having a split 12 located centrally of the cylinder 10 and extending substantially lengthwise thereof.

Referring to both FIGS. 1 and 2, there are shown securing means 20 affixed to the cylinder 10 in close proximity of the split 12. Securing means 20 comprises a strap and buckle arrangement 21 which are spaced equidistant one from another for the purpose of adjusting the cross-sectional area of the cone-shaped cylinder 10 in order to accommodate various sized animals. Affixed to the cylinder 10 is a three-sided rectangularly-shaped base 22 to which is attached a retaining means 24 for stabilizing the device when the device is in use. An opening 15 in the split portion of the cylinder allows access to the navel areas for correcting the rupture of the navel.

Referring to FIG. 3, it is shown that the retaining means 24 is secured to the base 22 of the device by bolts 26 which are secured to the base 22 by nuts or the like to prevent the retaining means 24 from moving once the device is properly positioned over a fence or similar support when the device is in use. Also shown at the base of the restraining device are strap-buckles 14 for securing the rear legs of the animal.

The retaining means 24 comprises a plurality of right angled hooks 28 which are hung over a fence or similar support for securing the device thereto.

In operation, a small animal, for example a pig, is placed through the large opening 30 of the cylinder 10 such that the pig's body extends longitudinally through the cylinder 10 whereby the nose of the animal extends through the small opening 32 of the device allowing the ringing of the nose and the detusking of the animal and the rear of the animal protrudes through the large opening 30 of the device exposing the genital area of the animal to allow for the neuter and correcting the hemorrhoids with the strap-buckle 14 securing the rear legs of the animal. By allowing the rear end of the animal to be exposed through the opening 30, there is easy access to the genital area for neutering, correcting hemorrhoids and correcting rectum rupture. The strap-buckle arrangements 21 and 14 are then fastened thereabout to secure the animal prior to performing any of the desired procedures on the animal.

Although a limited embodiment for the animal restraining device has been described and illustrated herein, many modifications and variations will be apparent to one skilled in the art. It is, therefore, to be understood that within the scope of the appended claims, the invention may be practiced otherwise than as specifically described.

What is claimed is:

1. An animal restraining device comprising;
   (a) a tapered cone-shaped cylinder having a split disposed centrally thereof and extending lengthwise of said cylinder;
   (b) a plurality of securing means affixed to said cylinder adjacent to said split and spaced equidistantly from one another for adjusting the cone-shaped cylinder of said cylinder for accommodating various sized animals;

(c) a three-sided, rectangularly-shaped base affixed to the large opening of said cylinder having disposed along one side thereof a retaining means for maintaining the device in a stable position while it is in operation; and (d) two securing means affixed to the base of the cylinder at opposed ends that and opposite said split which are adjustable to accommodate the rear legs of the animal.

2. The invention as recited in claim 1, wherein said cylinder is made of a flexible material such as plastic, leather and the like.

3. The invention as recited in claim 1 wherein, said securing means comprises a plurality of flexible straps and buckles permanently affixed to the cylinder whereby the straps and buckles are disposed opposite one another on either side of the split on said cylinder, said straps having a plurality of apertures for accommodating the stems frome buckles for adjusting a conical crosssection of said cylinder.

4. The invention as recited in claim 1 wherein, said base is integrally formed with said cylinder and has retaining means disposed along a side thereof for positioning the device over a fence or similar support when in use.

5. The invention as recited in claim 4 wherein, said retaining means comprises a plurality of right-angled hooks affixed to a plate which is bolted to the side of said base, which side abuts the split in said cylinder.

* * * * *